United States Patent
Yoshioka et al.

(10) Patent No.: US 9,017,615 B2
(45) Date of Patent: Apr. 28, 2015

(54) ELECTRICALLY HEATED CATALYST

(75) Inventors: Mamoru Yoshioka, Susono (JP); Takashi Watanabe, Gotennba (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 53 days.

(21) Appl. No.: 13/820,673

(22) PCT Filed: Sep. 10, 2010

(86) PCT No.: PCT/JP2010/065612
§ 371 (c)(1),
(2), (4) Date: Mar. 4, 2013

(87) PCT Pub. No.: WO2012/032652
PCT Pub. Date: Mar. 15, 2012

(65) Prior Publication Data
US 2013/0156651 A1    Jun. 20, 2013

(51) Int. Cl.
*B01D 50/00*    (2006.01)
*B01D 53/94*    (2006.01)
(Continued)

(52) U.S. Cl.
CPC .............. *B01D 53/94* (2013.01); *B01D 53/88* (2013.01); *B01D 53/9418* (2013.01); *B01D 53/9422* (2013.01); *B01D 53/944* (2013.01); *B01D 53/945* (2013.01); *B01D 53/9495* (2013.01); *F01N 3/2013* (2013.01); *F01N 3/2026* (2013.01); *F01N 3/2853* (2013.01);
(Continued)

(58) Field of Classification Search
USPC .............................. 422/174, 177, 179; 55/523
See application file for complete search history.

(56) References Cited

U.S. PATENT DOCUMENTS 5,070,694 A    12/1991    Whittenberger
5,264,186 A    11/1993    Harada et al.
(Continued)

FOREIGN PATENT DOCUMENTS

JP    05-231140 A    9/1993
JP    5-269387 A    10/1993
(Continued)

OTHER PUBLICATIONS

U.S. Non-Final Office Action dated Mar. 4, 2014, issued in corresponding U.S. Appl. No. 13/695,532.
(Continued)

*Primary Examiner* — Tom Duong
(74) *Attorney, Agent, or Firm* — Sughrue Mion, PLLC

(57) ABSTRACT

Electricity is suppressed from flowing to a case (4) of an electrically heated catalyst (1). Provision is made for a heat generation element (2) to be electrically energized to generate heat, the case (4) in which the heat generation element (2) is contained, a mat (5) arranged between the heat generation element (2) and the case (4), an electrode (6) connected to the heat generation element (2) from outside of the case (4), an insulation part (7) to plug a gap between the case (4) and the electrode (6), an electrode chamber (8) which is a space formed around the electrode (6) at an inner side of the case (4) and at an outer side of the heat generation element (2), and which is formed by providing a gap between the electrode (6) and the mat (5), and a circulation passage (9) which is provided with two opening portions (91) either at an upstream side or at a downstream side of the heat generation element (2), and which is connected from one of the opening portions (91) to the other of the opening portions (91) while passing through around said electrode (6).

5 Claims, 7 Drawing Sheets

(51) Int. Cl.
   *F01N 3/20* (2006.01)
   *F01N 3/28* (2006.01)
   *B01D 53/88* (2006.01)

(52) U.S. Cl.
   CPC ......... *F01N2240/16* (2013.01); *F01N 2410/02* (2013.01); *F01N 2410/06* (2013.01); *Y02T 10/22* (2013.01); *Y02T 10/26* (2013.01)

(56) References Cited

U.S. PATENT DOCUMENTS 5,839,276 A    11/1998   Nishizawa
2011/0131962 A1    6/2011    Toi et al.
2012/0047881 A1    3/2012    Kumagai et al.

FOREIGN PATENT DOCUMENTS

| | | |
|---|---|---|
| JP | 08-210127 A | 8/1996 |
| JP | 2007-239556 A | 9/2007 |
| JP | 2008-014186 A | 1/2008 |
| JP | 2010-59960 A | 3/2010 |

OTHER PUBLICATIONS

U.S. Final Office Action dated Jun. 25, 2014, issued in corresponding U.S. Appl. No. 13/695,532.

Communication dated Jan. 16, 2015, issued by the U.S. Patent and Trademark Office in corresponding U.S. Appl. No. 13/695,532.

[Fig. 1]
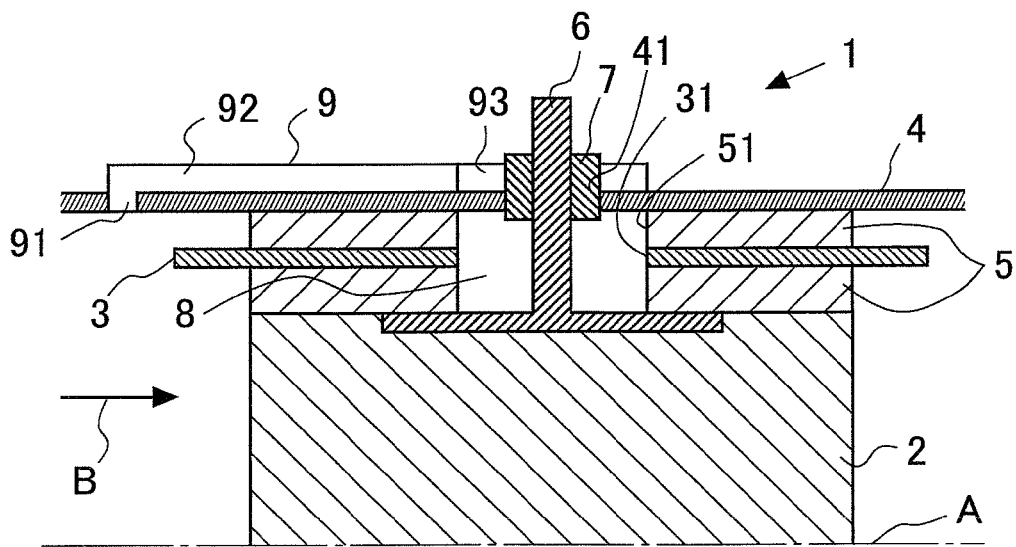
[Fig. 2]
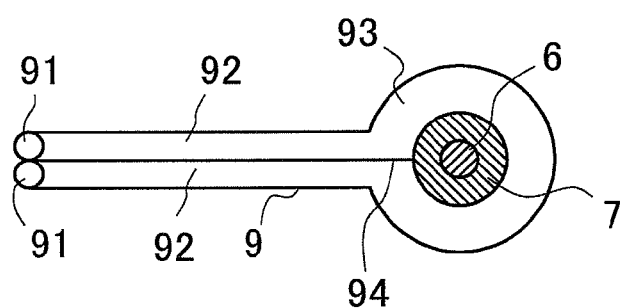

[Fig. 3]
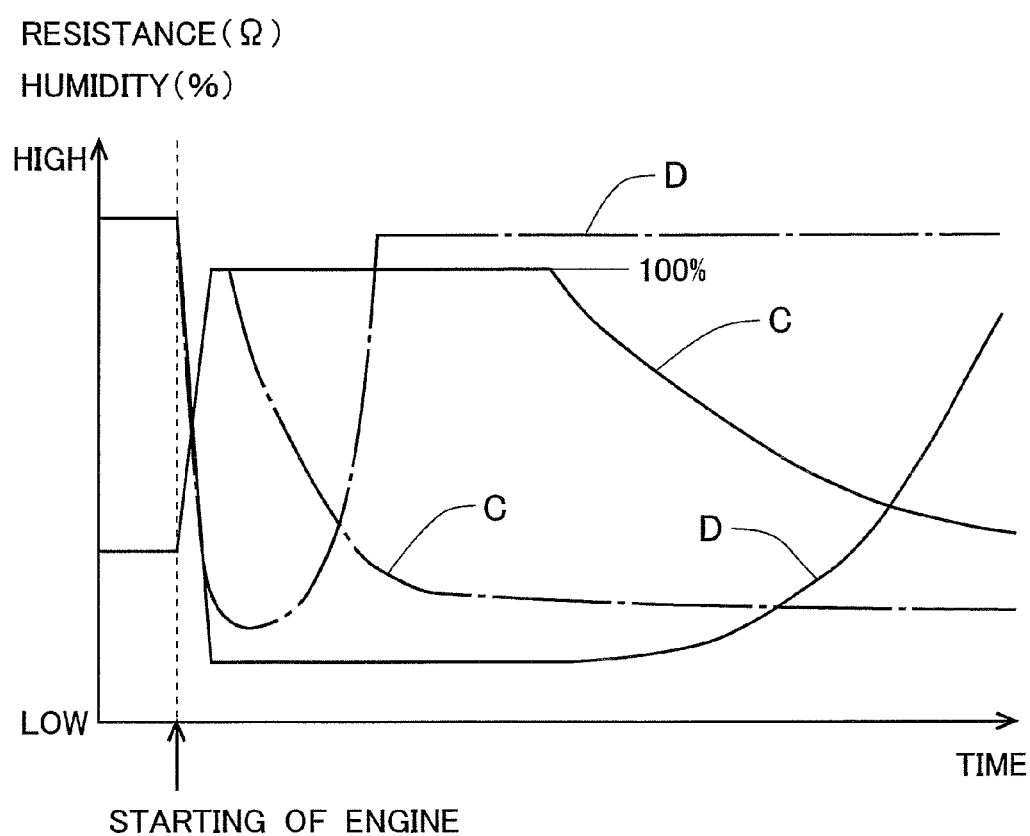

[Fig. 4]
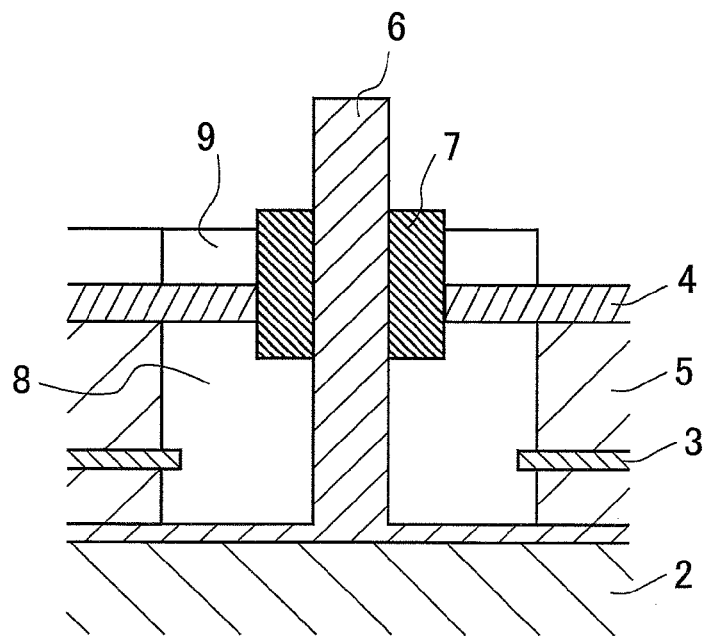
[Fig. 5]
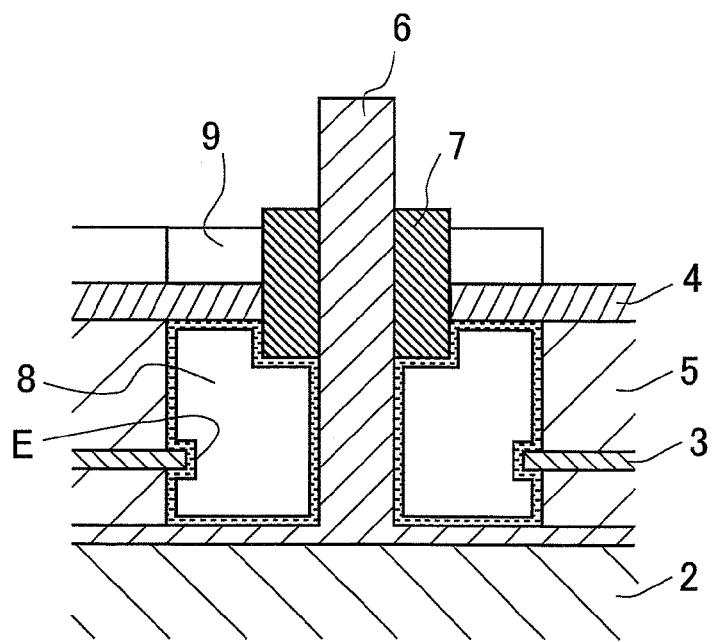

[Fig. 6]
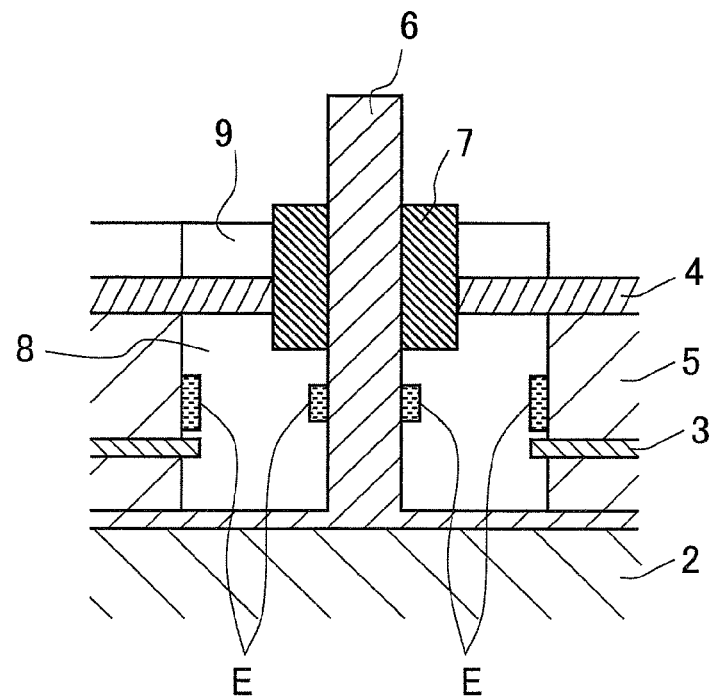
[Fig. 7]
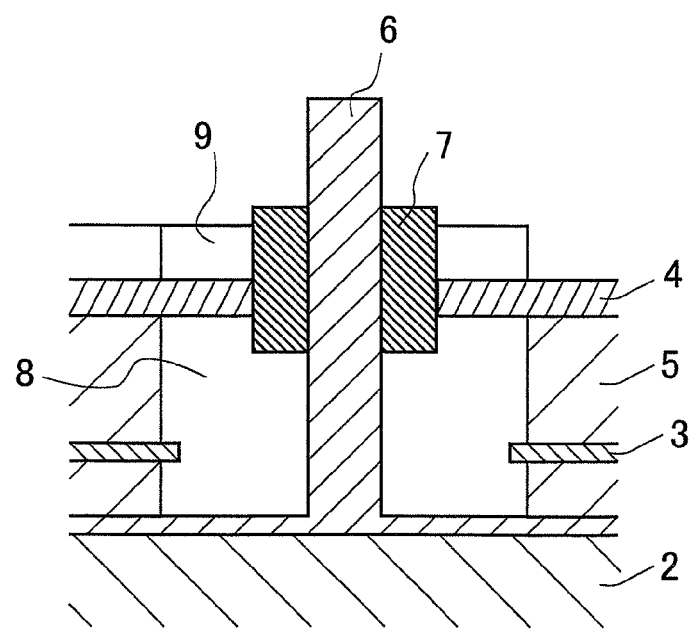

[Fig. 8]
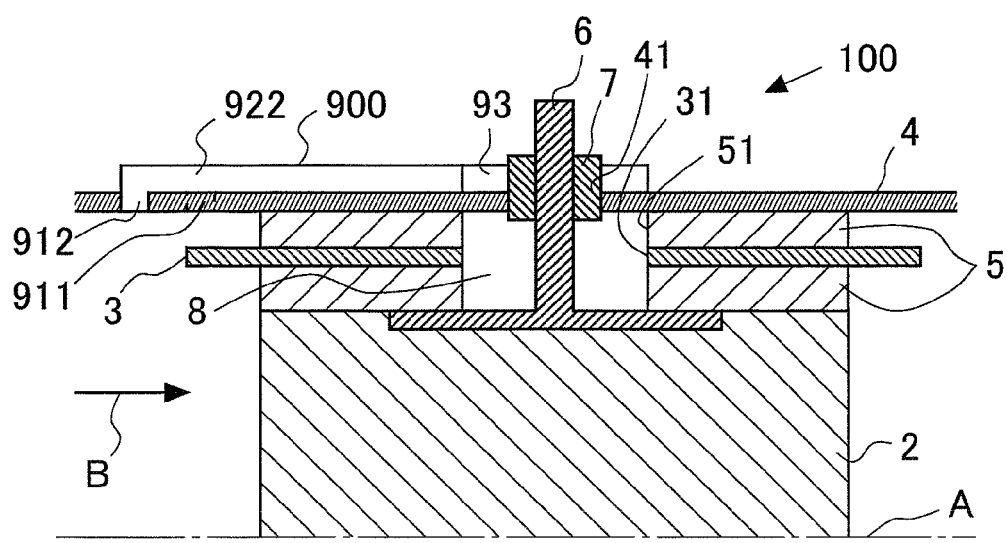
[Fig. 9]
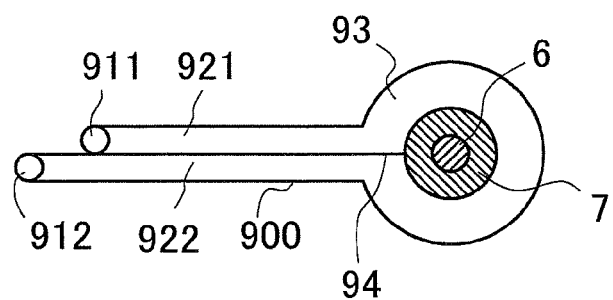

[Fig. 10]
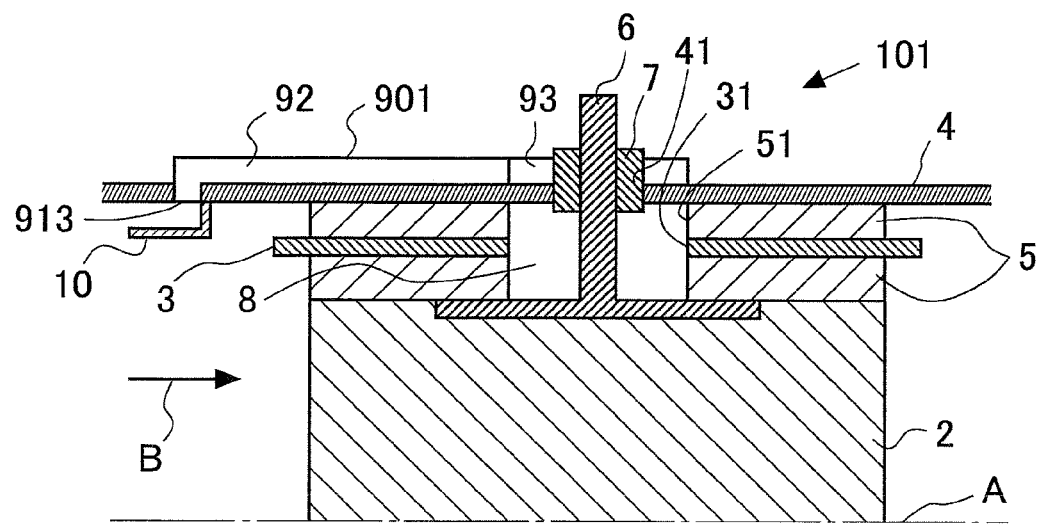
[Fig. 11]
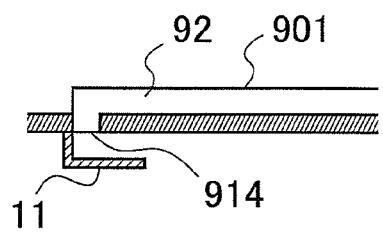

[Fig. 12]
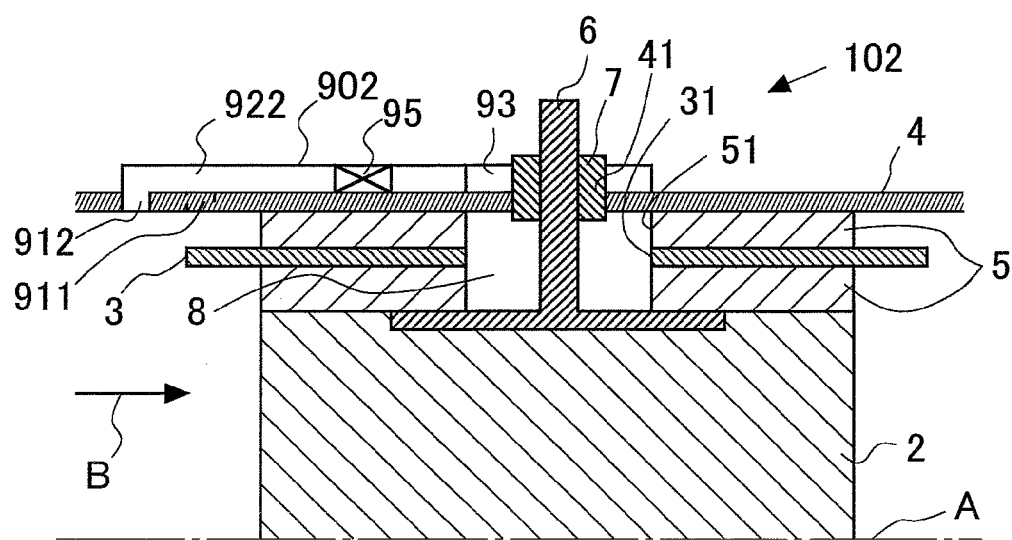
[Fig. 13]
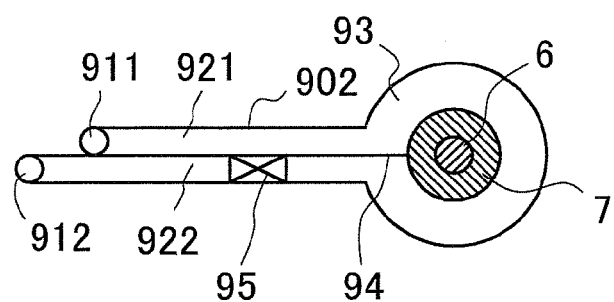

ELECTRICALLY HEATED CATALYST

CROSS REFERENCE TO RELATED APPLICATIONS

This application is a National Stage of International Application No. PCT/JP2010/065612, filed on Sep. 10, 2010, the contents of all of which are incorporated herein by reference in their entirety.

TECHNICAL FIELD

The present invention relates to an electrically heated catalyst.

BACKGROUND ART

There has been known a technique in which a mat of an insulating material is arranged between a carrier of a catalyst which is electrically energized to generate heat, and a case which contains therein the carrier of the catalyst (for example, see a first patent document). According to this mat, when the carrier of the catalyst is electrically energized, it is possible to suppress an electric current from flowing to the case.

Incidentally, moisture is contained in an exhaust gas of an engine, so water may condense in the case or the like. This water flows on an inner surface of the case, adheres to the mat, and is then absorbed into the mat. The water absorbed into the mat moves in the interior of the mat. Then, the water in the mat evaporates due to the heat of the exhaust gas or the heat of a heat generation element, so it will be removed as time passes. However, if starting and stopping of the engine are repeated in a relatively short period of time, an amount of condensed water will increase, thus making it difficult for the water in the mat to be removed. For this reason, humidity around an electrode will become high, and insulation resistance between the electrode and the case will decrease, so there is a fear that electricity may flow to the case from the electrode.

PRIOR ART REFERENCES

Patent Documents

First Patent Document: Japanese patent application laid-open No. H05-269387
Second Patent Document: Japanese patent application laid-open No. 2010-059960

SUMMARY OF THE INVENTION

Problems to be Solved by the Invention

The present invention has been made in view of the above-mentioned problem, and an object of the present invention is to suppress electricity from flowing to a case of an electrically heated catalyst.

Means for Solving the Problems

In order to achieve the above-mentioned object, an electrically heated catalyst according to the present invention is provided with:
a heat generation element that is adapted to be electrically energized to generate heat;
a case that contains said heat generation element therein;
a mat that is arranged between said heat generation element and said case, and serves to insulate electricity and at the same time to support said heat generation element;
an electrode that is connected to said heat generation element from outside of said case;
an insulation part that plugs a gap between said case and said electrode;
an electrode chamber that is a space formed around said electrode at an inner side of said case and at an outer side of said heat generation element, and is formed by providing a gap between said electrode and said mat; and
a circulation passage that is provided with two opening portions either at an upstream side or at a downstream side of said heat generation element, and is connected from one of said opening portions to the other of said opening portions while passing through around said electrode.

The heat generation element may also be a carrier for the catalyst, or may be arranged at an upstream side of the catalyst. By electrically energizing the heat generation element, the heat generation element generates heat, so that the temperature of the catalyst can be raised.

Here, the heat generation element becomes high in temperature in an early stage due to the heat of an exhaust gas and the reaction heat in the catalyst, so in the surroundings of the heat generation element, evaporation of water is fast. On the other hand, the case in the surroundings of the electrode chamber is difficult to receive the heat of the exhaust gas, and in addition, the outer side of the case is in contact with outside air, so the temperature thereof does not go up easily. For this reason, evaporation of water becomes slow in the surroundings of the case.

In contrast to this, due to the provision of the circulation passage, the temperature in the surroundings of the electrode can be raised in a quick manner. That is, the exhaust gas which has been introduced into the circulation passage from any of the opening portions circulates through the interior of the circulation passage, for example, under the action of pulsation of the exhaust gas. In that case, the heat of the exhaust gas inside the circulation passage will be transmitted to the electrode and the case, so that the temperature of the electrode and the case will go up. As a result of this, it is possible to evaporate and remove the water adhered to the surroundings of the case inside the electrode chamber, so it is possible to suppress electricity from flowing to the case. Here, note that the circulation passage may be arranged along the case in order to raise the temperature of the case. Also, the circulation passage may be arranged in the inside of the case, or may be arranged in the outside of the case.

In addition, in the present invention, said opening portions can be arranged in a shifted manner in a direction of flow of the exhaust gas. If doing so, a pressure difference will occur between one side and the other side of the opening portions due to a phase difference in the pulsation of the exhaust gas. According to this, the flow of the exhaust gas in the circulation passage can be facilitated, so more heat can be provided to the electrode chamber.

Moreover, in the present invention, an inflow guide, which serves to direct an exhaust gas flowing through said case to one of said opening portions, can be provided at the one of said opening portions. If doing so, a lot of exhaust gas can be caused to flow into the one of the opening portions, so it is possible to cause a lot of exhaust gas to flow through the circulation passage. According to this, it is possible to provide more heat to the surroundings of the electrode chamber.

Further, in the present invention, an outflow guide, which serves to direct an exhaust gas flowing out of the other of said opening portions to a downstream side of said case, can be provided at the other of said opening portions. Then, a lot of exhaust gas can be caused to flow out of the other of the opening portions, so it is possible to cause a lot of exhaust gas to flow through the circulation passage. According to this, it is possible to provide more heat to the surroundings of the electrode chamber.

Furthermore, in the present invention, provision can be made for a block part that serves to block said circulation passage when the temperature of the exhaust gas flowing through said circulation passage becomes equal to or higher than a threshold value. By blocking the circulation passage, it is possible to suppress heat from being supplied to the surroundings of the electrode chamber. Here, when the exhaust gas of high temperature is caused to circulate around the electrode, there is a fear that the electrode may be overheated. Accordingly, when there is the fear that the electrode may be overheated, the block part blocks or closes the circulation passage. In other words, the threshold value may also be a temperature at which the electrode overheats. In addition, the threshold value may also be a temperature with a certain amount of margin at which the electrode overheats. By blocking the circulation passage, the amount of heat supplied to the electrode is decreased, so overheating of the electrode can be suppressed.

Effect of the Invention

According to the present invention, it is possible to suppress electricity from flowing to the case of the electrically heated catalyst.

BRIEF DESCRIPTION OF THE DRAWINGS

[FIG. 1] is a view showing the schematic construction of an electrically heated catalyst according to a first embodiment of the present invention.

[FIG. 2] is a cross sectional view when a circulation passage is cut by a surface which is orthogonal to the central axis of an electrode.

[FIG. 3] is a time chart showing the changes over time of the humidity and the insulation resistance in each of the electrode chambers.

[FIG. 4] is a cross sectional view of the electrode chamber according to the first embodiment.

[FIG. 5] is a cross sectional view of the electrode chamber according to the first embodiment.

[FIG. 6] is a cross sectional view of the electrode chamber according to the first embodiment.

[FIG. 7] is a cross sectional view of the electrode chamber according to the first embodiment.

[FIG. 8] is a view showing the schematic construction of an electrically heated catalyst according to a second embodiment of the present invention.

[FIG. 9] is a cross sectional view when a circulation passage is cut by a surface which is orthogonal to the central axis of an electrode.

[FIG. 10] is a view showing the schematic construction of an electrically heated catalyst according to a third embodiment of the present invention.

[FIG. 11] is a cross sectional view of an other opening portion.

[FIG. 12] is a view showing the schematic construction of an electrically heated catalyst according to a fourth embodiment of the present invention.

[FIG. 13] is a cross sectional view when a circulation passage is cut by a surface which is orthogonal to the central axis of an electrode.

MODES FOR CARRYING OUT THE INVENTION

Hereinafter, reference will be made to specific embodiments of an electrically heated catalyst according to the present invention based on the attached drawings. Here, note that the following embodiments can be combined as appropriate.

[First Embodiment]

FIG. 1 is a view showing the schematic construction of an electrically heated catalyst 1 according to this first embodiment of the present invention. Here, note that the electrically heated catalyst 1 according to this embodiment is arranged in an exhaust pipe of an engine mounted on a vehicle. The engine may be a diesel engine or may be a gasoline engine. In addition, it can also be used in a vehicle which adopts a hybrid system equipped with an electric motor.

The electrically heated catalyst 1 shown in FIG. 1 is a cross sectional view cutting the electrically heated catalyst 1 along a central axis A thereof in a longitudinal or vertical direction thereof. Here, note that the electrically heated catalyst 1 has a shape with line symmetry with respect to the central axis A, and hence in FIG. 1, only an upper part thereof is shown. In addition, in FIG. 1, an arrow B shows the direction of the flow of an exhaust gas.

The electrically heated catalyst 1 according to this embodiment is provided with a carrier 2 for a catalyst (hereinafter catalyst carrier) which has a cylindrical shape around the central axis A. And, the catalyst carrier 2, an inner pipe 3, and a case 4 are provided sequentially from the side of the central axis A. In addition, a mat 5 is arranged between the catalyst carrier 2 and the inner pipe 3, and between the inner pipe 3 and the case 4.

A material, which has electric resistance and is electrically energized to generate heat, is used for the catalyst carrier 2. SiC is used for the material of the catalyst carrier 2, for example. The catalyst carrier 2 has a plurality of passages which extend in a direction B of the flow of the exhaust gas (i.e., it may be the direction of the central axis A), and which have a cross section of honeycomb shape vertical to the flow direction B of the exhaust gas. The exhaust gas flows through these passages. The catalyst carrier 2 has an outer shape which is a cylindrical shape centering on the central axis A of the exhaust pipe, for example. Here, note that the sectional shape of the catalyst carrier 2 formed by the cross section which is orthogonal to the central axis A may be an elliptical shape, for example. The central axis A is a central axis common to the exhaust pipe, the catalyst carrier 2, the inner pipe 3, and the case 4. Here, note that in this embodiment, the catalyst carrier 2 corresponds to a heat generation element in the present invention. In addition, this embodiment can be applied similarly even in cases where the heat generation element is provided at the upstream side of the catalyst.

The catalyst is carried or supported by the catalyst carrier 2. As the catalyst, there can be mentioned an oxidation catalyst, a three-way catalyst, an NOx storage reduction catalyst, an NOx selective reduction catalyst, etc., for example. Two pieces of electrodes 6 are connected to the catalyst carrier 2, so that the catalyst carrier 2 is electrically energized by applying a voltage between these electrodes 6. The catalyst carrier 2 generates heat due to the electric resistance of this catalyst carrier 2.

As the mat 5, there is used an electrically insulating material such as, for example, ceramic fiber which includes alumina as its main component. The mat 5 is wound around an outer peripheral surface of the catalyst carrier 2 and an outer peripheral surface of the inner pipe 3. The mat 5 covers the outer peripheral surface (the surface parallel to the central axis A) of the catalyst carrier 2, so that when the catalyst carrier 2 is electrically energized, the mat 5 serves to suppress electricity from flowing to the inner pipe 3 and the case 4.

As the material of the inner pipe 3, there is used an electrically insulating material such as, for example, alumina. The inner pipe 3 is formed into a tubular shape with the central axis A being located as a center thereof. The inner pipe 3 has a length in the direction of the central axis A longer than that of the mat 5. As a result, the inner pipe 3 protrudes from the mat 5 to an upstream side thereof and a downstream side thereof, respectively. An inside diameter of the inner pipe 3 is substantially the same as an outside diameter of the mat 5 at the time when the mat 5 is wound around the outer periphery of the catalyst carrier 2. For this reason, when the mat 5 and the catalyst carrier 2 are contained or inserted into the inner pipe 3, the mat 5 is compressed, so the catalyst carrier 2 is fixed into the inner pipe 3 due to a repulsive force or resilience of the mat 5. Here, note that in this embodiment, the inner pipe 3 is provided, but it is not necessary to use the inner pipe 3.

Metal is used for the material of the case 4, and for example, a stainless steel material can be used. Inside the case 4, there are contained the catalyst carrier 2, the inner pipe 3, and the mat 5. An inside diameter of the case 4 is substantially the same as the outside diameter of the mat 5 at the time when the mat 5 is wound around the outer periphery of the inner pipe 3, and the mat 5 is compressed when the mat 5 and the inner pipe 3 are contained or inserted into the case 4, so the inner pipe 3 is fixed into the case 4 due to the repulsive force of the mat 5.

The two pieces of electrodes 6 are connected to the catalyst carrier 2. Holes 31, 41, 51 are opened in the inner pipe 3, the case 4, and the mat 5, respectively, in order to pass these electrodes 6 therethrough. The diameter of each of these holes 31, 41, 51 is larger than the diameter of each of the electrodes 6. For this reason, the inner pipe 3, the case 4 and the mat 5 are separated from the electrodes 6. Then, insulation parts 7, which serve to support the electrodes 6, respectively, are arranged in the holes 41, respectively, which are opened in the case 4. An insulating material is used for the material of the insulation parts 7. In addition, the insulation parts 7 are arranged with no gap between the case 4 and the electrodes 6, respectively. In this manner, inside the case 4, there is formed an electrode chamber 8 in the form of a closed space around each of the electrodes 6.

Circulation passages 9 through which the exhaust gas circulates are formed in the outside of the case 4. FIG. 2 is a cross sectional view when the circulation passages 9 are cut by a surface which is orthogonal to the central axis of the electrodes 6. The circulation passages 9 are each provided with two opening portions 91 at the upstream side of the catalyst carrier 2. These opening portions 91 are arranged adjacent to each other in a circumferential direction of the case 4. The opening portions 91 penetrate through the case 4, and open toward the interior of the case 4.

Straight portions 92, which are formed along the outer surface of the case 4 in parallel with the central axis A, are connected with the opening portions 91, respectively. The individual straight portions 92 are connected with an annular portion 93 which is formed around the central axis of each of the electrodes 6. In each annular portion 93, there is formed a partition wall 94 between the adjacent individual straight portions 92 in such a manner that a passage for the exhaust gas flowing from one of the straight portions 92 to the other straight portion goes around a corresponding electrode 6. Each annular portion 93 is in contact with an outer peripheral surface of a corresponding insulation part 7. In addition, at the side of the central axis A from the annular portions 93, there exists the case 4, and further, at the side of the central axis A from the case 4, there exist the electrode chambers 8.

In the electrically heated catalyst 1 as constructed in this manner, the water condensed at the upstream side of the catalyst carrier 2 may flow on the inner wall of the case 4, and may adhere to the mat 5. This water adheres to a portion of the mat 5 between the inner pipe 3 and the case 4. That is, because the inner pipe 3 protrudes to the upstream side and the downstream side of the mat 5, it is possible to suppress the water from coming into the inner side of the inner pipe 3. As a result of this, it is possible to suppress the case 4 and the catalyst carrier 2 from being short-circuited to each other by means of the water at an upstream end and a downstream end of the mat 5.

In addition, when particulate matter (hereinafter also referred to as PM) in the exhaust gas adheres to the mat 5 and/or the inner pipe 3, there is a fear that a short circuit may be formed between the case 4 and the catalyst carrier 2 by means of the particulate matter. However, because the inner pipe 3 protrudes from the mat 5, the protruded portions of the inner pipe 3 receive the heat of the exhaust gas, and become high in temperature, so the PM adhered to the inner pipe 3 can be removed by the oxidation thereof. According to this, it is possible to suppress the short circuit between the case 4 and the catalyst carrier 2 through the PM.

Incidentally, the water adhered to the mat 5 evaporates due to the heat of the exhaust gas and the heat of the catalyst carrier 2. However, as the amount of water adhered increases, a part thereof will stay in the interior of the mat 5, without evaporating immediately. Then, the water may reach up to the electrode chambers 8 around the electrodes 6 while passing through the interior of the mat 5, so that it may stay in the electrode chambers 8. Thus, the water existing in the electrode chambers 8 will be difficult to be removed, even if it evaporates. When water vapor exists in the electrode chambers 8, the insulation resistance between the electrodes 6 and the case 4 will be decreased to a large extent. Then, there will be a fear that when there is a request to raise the temperature of the catalyst carrier 2, electrical energization thereof may become impossible.

Here, FIG. 3 is a time chart showing the changes over time of the humidity and the insulation resistance in each of the electrode chambers. This figure shows a case where it is assumed that the circulation passages 9 according to this embodiment are not provided.

C denotes the humidity in each of the electrode chambers, and D denotes the insulation resistance. In addition, a solid line denotes a case in which starting and stopping of the engine are repeated with a relatively short period or cycle, and an alternate long and short dash line denotes a case in which starting and stopping of the engine are repeated with a relatively long period or cycle.

If starting and stopping of the engine are repeated with a relatively long period or cycle, the temperature of the interior of the mat 5 will become high, thus making it easy for the water in the interior of the mat 5 to be removed. In that case, the amount of water which stays in the interior of the mat 5 will decrease, so the humidity in the electrode chambers 8 drops immediately after the starting of the engine. For this reason, the insulation resistance is also restored immediately.

On the other hand, if starting and stopping of the engine are repeated with a relatively short period or cycle, it will become difficult for the water in the interior of the mat 5 to be removed, so the amount of water staying in the interior of the mat 5 will increase. As a result of this, the humidity in the electrode chambers 8 does not immediately drop after the starting of the engine. In addition, when the humidity in the electrode chambers 8 becomes high, condensed water is generated inside the electrode chambers 8 at the time of cold starting of the engine. Thus, there is a fear that through this condensed water, electricity may flow to the case 4 from the electrodes 6. Here, the catalyst carrier 2 becomes high in temperature due to the heat of the exhaust gas and the reaction heat in the catalyst, so in the surroundings of the catalyst carrier 2 inside the electrode chambers 8, evaporation of water is fast. On the other hand, the surroundings of the case 4 inside of the electrode chambers 8 are difficult to receive the heat of the exhaust gas, and in addition, the outer side of the case 4 is in contact with outside air, so the temperature thereof does not go up easily. For this reason, evaporation of water becomes slow in the surroundings of the case 4. As a result, there is a fear that electricity may flow from the electrodes 6 to the case 4.

In contrast to this, the temperature of the case 4 in the surroundings of the electrode chambers 8 can be raised in a quick manner due to the provision of the circulation passages 9. That is, the exhaust gas, which has been introduced into the circulation passages 9 from any of the opening portions 91, flows through the interiors of the circulation passages 9, for example, under the action of pulsation of the exhaust gas. In that case, the heat of the exhaust gas inside the circulation passages 9 is transmitted to the case 4, so that the temperature of this case 4 goes up. As a result of this, it is possible to evaporate and remove the water adhered to the surroundings of the case 4 inside the electrode chambers 8.

Here, FIG. 4 through FIG. 7 are cross sectional views of one of the electrode chamber 8 according to this embodiment. FIG. 4 shows a state thereof before starting of the engine. At this point in time, condensed water has not yet been generated. FIG. 5 shows a state thereof immediately after cold starting of the engine. At this point in time, condensed water E has adhered to the entire electrode chamber 8.

FIG. 6 shows an intermediate state thereof in the course from the cold starting of the engine to the warming up thereof. At this time, condensed water in the surroundings of the catalyst carrier 2 evaporates due to the rise in temperature of the catalyst carrier 2 by the heat of the exhaust gas and the heat of reactions. Also, condensed water in the surroundings of the case 4 evaporates due to the rise in temperature of the case 4 by the heat from the circulation passages 9. As a result of this, the condensed water E remains only in the surroundings of the inner pipe 3. Thus, although the condensed water E remains only in the surroundings of the inner pipe 3, water is not adhered to the mat 5 and the insulation part 7 which are located at the side of the case 4 from the inner pipe 3, so electricity is suppressed from flowing to the case 4 from the electrodes 6. However, if the circulation passages 9 are not provided, the condensed water remains at the side of the case 4 at this point in time, so there is a fear that electricity may flow to the case 4 from the electrodes 6. Accordingly, due to the provision of the circulation passages 9, the condensed water in the surroundings of the case 4 can be removed at an early stage, and hence, it becomes possible to provide electrical energization to the electrodes 6 at an early stage. In addition, FIG. 7 shows a state after warming up of the engine. At this point in time, the condensed water has been removed from the electrode chambers 8, so the electrical insulation resistance thereof is also restored.

As described above, according to this embodiment, the condensed water inside the electrode chambers 8 in the surroundings of the case 4 can be removed at an early stage by means of the circulation passages 9, so it is possible to suppress electricity from flowing to the case 4 from the electrodes 6.

Here, note that in this embodiment, the opening portions 91 are arranged at the upstream side of the catalyst carrier 2, but instead of this, the opening portions 91 may be arranged at the downstream side of the catalyst carrier 2. If doing so, the exhaust gas, of which the temperature has been raised by the catalyst carrier 2, can be introduced into the circulation passages 9.

[Second Embodiment]

FIG. 8 is a view showing the schematic construction of an electrically heated catalyst 100 according to this second embodiment of the present invention. In addition, FIG. 9 is a cross sectional view when a circulation passage 900 is cut by a surface which is orthogonal to a central axis of an electrode 6. What is different from the electrically heated catalyst 1 shown in the first embodiment will be explained. Here, note that the same symbols are attached to the same members as those in the electrically heated catalyst 1 shown in the first embodiment.

In this second embodiment, at an upstream side from one opening portion 911, there is arranged an other opening portion 912. That is, the one opening portion 911 and the other opening portion 912 are arranged in a shifted manner in a direction of flow B of the exhaust gas (which may also be in a direction of a central axis A). The one opening portion 911 and an annular portion 93 are connected with each other by one straight portion 921. Also, the other opening portion 912 and the annular portion 93 are connected with each other by an other straight portion 922. Because the other opening portion 912 is more distant from the annular portion 93 than the one opening portion 911, the other straight portion 922 is longer than the one straight portion 921.

In the electrically heated catalyst 100 as constructed in this manner, because the one opening portion 911 and the other opening portion 912 are arranged in the shifted manner in the exhaust gas flow direction B, a pressure difference is generated between the one opening portion 911 and the other opening portion 912. That is, pressure fluctuates or varies due to the pulsation of the exhaust gas in the one opening portion 911 and in the other opening portion 912, respectively, so a phase difference occurs in the variation of the pressure due to a shift in the exhaust gas flow direction B. According to this phase difference, the pressure difference occurs between the one opening portion 911 and the other opening portion 912.

According to this pressure difference, the flow of the exhaust gas in the circulation passage 900 can be facilitated, so more heat can be provided to the surroundings of the electrode 6. As a result of this, the adhered water lying from the electrode 6 up to the case 4 can be caused to evaporate in a quick manner. Here, note that an optimum value of the distance in the exhaust gas flow direction B between the one opening portion 911 and the other opening portion 912 can be obtained through experiments, etc.

As described above, according to this second embodiment, the condensed water inside the electrode chamber 8 in the surroundings of the case 4 can be removed at an early stage by way of the circulation passage 900, so it is possible to suppress electricity from flowing to the case 4 from the electrode 6.

[Third Embodiment]

FIG. 10 is a view showing the schematic construction of an electrically heated catalyst 101 according to this third embodiment of the present invention. FIG. 10 is a cross sectional view cutting one opening portion 913. Also, FIG. 11 is a cross sectional view of an other opening portion 914. What is different from the electrically heated catalyst 1 shown in the first embodiment will be explained. Here, note that the same symbols are attached to the same members as those in the electrically heated catalyst 1 shown in the first embodiment.

In this embodiment, a case 4 is provided on its inner wall with an inflow guide 10 that serves to facilitate the inflow of an exhaust gas into the one opening portion 913 of a circulation passage 901, and an outflow guide 11 that serves to facilitate the outflow of an exhaust gas from the other opening portion 914 of the circulation passage 901.

The inflow guide 10 is, for example, a plate made of metal which has its plate thickness direction in parallel with a central axis A, and which extends in the direction of the central axis A from that portion of an inner surface of the case 4 which is at a downstream side of the one opening portion 913, and then bends to an upstream side of the exhaust gas flow direction B. Here, note that the inflow guide 10 may be of any other shape as long as it can direct the flow of the exhaust gas to the one opening portion 913. For example, the inflow guide may be a plate which extends in the direction of the central axis A from that portion of the inner surface of the case 4 which is at the downstream side of the one opening portion 913. In addition, the inflow guide may be a plate which approaches the central axis A as it goes from that portion of the inner surface of the case 4 which is at the downstream side of the one opening portion 913, to an upstream side thereof.

The outflow guide 11 is, for example, a plate made of metal which has its plate thickness direction in parallel with the central axis A, and which extends in the direction of the central axis A from that portion of the inner surface of the case 4 which is at the upstream side of the other opening portion 914, and then bends to a downstream side of the exhaust gas flow direction B. Here, note that the outflow guide 11 may be of other shapes as long as it can direct the exhaust gas flowing out of the other opening portion 91 to the downstream side of the case 4, or as long as it can suppress the exhaust gas flowing through the interior of the case 4 from flowing into the other opening portion 914. For example, the outflow guide may be a plate which extends in the direction of the central axis A from that portion of the inner surface of the case 4 which is at the upstream side of the other opening portion 914. In addition, the outflow guide may be a plate which approaches the central axis A as it goes from that portion of the inner surface of the case 4 which is at the upstream side of the other opening portion 914, to the downstream side thereof. By the provision of the inflow guide 10 and the outflow guide 11 as constructed in such a manner, the one opening portion 913 serves as an inlet for the exhaust gas, and the other opening portion 914 serves as an exit for the exhaust gas.

Here, note that in this embodiment, the one opening portion 913 and the other opening portion 914 may be arranged adjacent to each other, as shown in the first embodiment, or may be shifted with respect to each other in the exhaust gas flow direction B, as shown in the second embodiment.

In the electrically heated catalyst 101 constructed in this manner, the inflow of the exhaust gas to the one opening portion 913 is facilitated, and the outflow of the exhaust gas from the other opening portion 914 is also facilitated, so it is possible to facilitate the flow of the exhaust gas in the circulation passage 901. For this reason, more heat can be provided to the surroundings of an electrode 6. As a result of this, the adhered water lying from the electrode 6 up to the case 4 can be caused to evaporate in a quick manner.

Here, note that, in this embodiment, the inflow guide 10 and the outflow guide 11 are both provided, but only either one of them may be provided. For example, even if only the inflow guide 10 is provided, the inflow of the exhaust gas into the one opening portion 913 is facilitated, so circulation of the exhaust gas in the circulation passage 901 is facilitated. On the other hand, even if only the outflow guide 11 is provided, the outflow of the exhaust gas from the other opening portion 914 is facilitated, so circulation of the exhaust gas in the circulation passage 901 is facilitated.

As described above, according to this third embodiment, the condensed water inside the electrode chamber 8 in the surroundings of the case 4 can be removed at an early stage by means of the circulation passage 901, so it is possible to suppress electricity from flowing to the case 4 from the electrode 6.

[Fourth Embodiment]

FIG. 12 is a view showing the schematic construction of an electrically heated catalyst 102 according to this fourth embodiment of the present invention. In addition, FIG. 13 is a cross sectional view when a circulation passage 902 is cut by a surface which is orthogonal to the central axis of an electrode 6. What is different from the electrically heated catalyst 100 shown in the second embodiment will be explained. Here, note that the same symbols are attached to the same members as those in the electrically heated catalyst 100 shown in the second embodiment.

In this embodiment, in the middle of an other straight portion 922 connected to an other opening portion 912, there is arranged a valve 95 which serves to block the other straight portion 922 at the time when the temperature is high. Here, note that the valve 95 may instead be arranged in one straight portion 921. The valve 95 is made of a bimetal or a shape memory alloy, for example, and is set in such a manner that it blocks or closes the other straight portion 922 at the time when the temperature of an exhaust gas passing through the other straight portion 922 becomes equal to or higher than a threshold value. This threshold value is set to a temperature at which the electrode 6 do not overheat. That is, when the exhaust gas of high temperature flows through the circulation passage 902, the valve 95 blocks the other straight portion 922 before the electrode 6 is overheated. As a result of this, the flow of the exhaust gas is interrupted, so it is possible to suppress heat from being supplied to the surroundings of the electrode 6, thus making it possible to suppress the electrode 6 from being overheated.

Here, note that in this embodiment, the other straight portion 922 is blocked by the valve 95 in an automatic manner, but instead of this, provision may be made for a sensor that measures the temperature of the exhaust gas, and a control device that controls the valve 95 based on an output signal of this sensor. In addition, in this embodiment, the valve 95 corresponds to a block part in the present invention.

As described above, according to this fourth embodiment, the condensed water inside the electrode chamber 8 in the surroundings of the case 4 can be removed at an early stage by means of the circulation passage 902, so it is possible to suppress electricity from flowing to the case 4 from each electrode 6. In addition, overheating of the electrode 6 can be suppressed by means of the valve 95.

EXPLANATION OF REFERENCE NUMERALS AND CHARACTERS

1 electrically heated catalyst
2 catalyst carrier
3 inner pipe
4 case
5 mat
6 electrodes
7 insulation parts
8 electrode chambers
9 circulation passages 91 opening portions
92 straight portions
93 annular portion
94 partition wall

The invention claimed is:

1. An electrically heated catalyst comprising:
a heat generation element that is adapted to be electrically energized to generate heat;
a case that contains said heat generation element therein;
a mat that is arranged between said heat generation element and said case and serves to insulate electricity and at the same time to support said heat generation element;
an electrode that is connected to said heat generation element from outside of said case;
an insulation part that plugs a gap between said case and said electrode;
an electrode chamber that is a space formed around said electrode at an inner side of said case and at an outer side of said heat generation element, and is formed by providing a gap between said electrode and said mat; and
a circulation passage that is provided with two opening portions either at an upstream side or at a downstream side of said heat generation element, and is connected from one of said opening portions to the other of said opening portions while passing through around said electrode, the circulation passage not connecting between said two openings and said electrode chamber.

2. The electrically heated catalyst as set forth in claim 1, wherein said opening portions are arranged in a shifted manner in a direction of flow of an exhaust gas.

3. The electrically heated catalyst as set forth in claim 1, wherein an inflow guide, which serves to direct an exhaust gas flowing through said case to one of said opening portions, is provided at the one of said opening portions.

4. The electrically heated catalyst as set forth in claim 1, wherein an outflow guide, which serves to direct an exhaust gas flowing out of the other of said opening portions to a downstream side of said case, is provided at the other of said opening portions.

5. The electrically heated catalyst as set forth in claim 1, wherein provision is made for a block part that serves to block said circulation passage when the temperature of an exhaust gas flowing through said circulation passage becomes equal to or higher than a threshold value.

* * * * *